(12) United States Patent
Cline

(10) Patent No.: US 6,658,349 B2
(45) Date of Patent: Dec. 2, 2003

(54) METHOD AND SYSTEM FOR MARINE VESSEL TRACKING SYSTEM

(76) Inventor: James Douglas Cline, 22865 Tindaya, Mission Viejo, CA (US) 92692-1326

(*) Notice: Subject to any disclaimer, the term of this patent is extended or adjusted under 35 U.S.C. 154(b) by 0 days.

(21) Appl. No.: 10/146,436

(22) Filed: May 14, 2002

(65) Prior Publication Data

US 2002/0169527 A1 Nov. 14, 2002

Related U.S. Application Data

(60) Provisional application No. 60/357,752, filed on Feb. 14, 2002, provisional application No. 60/330,442, filed on Oct. 17, 2001, provisional application No. 60/301,209, filed on Jun. 27, 2001, provisional application No. 60/299,902, filed on Jun. 21, 2001, and provisional application No. 60/290,793, filed on May 14, 2001.

(51) Int. Cl.$^7$ .............................. G01C 21/00; G01S 3/02
(52) U.S. Cl. ..................... 701/207; 701/21; 701/213; 340/992; 342/357.09
(58) Field of Search .................... 701/21, 213, 117, 701/207; 340/989, 992; 342/357.07, 357.09

(56) References Cited

U.S. PATENT DOCUMENTS

| | | | |
|---|---|---|---|
| 3,443,073 A | 5/1969 | Cohen | |
| 3,735,397 A | 5/1973 | Nirasawa | |
| 3,737,902 A | 6/1973 | O'Hagan et al. | |
| 3,890,616 A | 6/1975 | Kojima et al. | |
| 3,971,018 A | 7/1976 | Isbister et al. | |
| 4,339,751 A | 7/1982 | Pease | |
| 4,466,068 A | 8/1984 | Degre et al. | |
| 4,611,209 A | 9/1986 | Lemelson et al. | |
| 4,684,949 A | 8/1987 | Kalafus | |
| 4,706,090 A | 11/1987 | Hashiguchi et al. | |
| 4,839,631 A | * 6/1989 | Tsuji ........................... | 340/541 |
| 5,121,325 A | 6/1992 | DeJonge | |
| 5,153,836 A | 10/1992 | Fraughton et al. | |
| 5,191,341 A | 3/1993 | Gouard et al. | |
| 5,210,534 A | 5/1993 | Janex | |
| 5,307,074 A | 4/1994 | Janex | |
| 5,353,023 A | 10/1994 | Mitsugi | |
| 5,404,135 A | 4/1995 | Janex | |
| 5,414,432 A | 5/1995 | Penny, Jr. et al. | |
| 5,448,768 A | 9/1995 | Zinser | |
| 5,515,287 A | 5/1996 | Hakoyama et al. | |
| 5,519,403 A | 5/1996 | Bickley et al. | |
| 5,570,100 A | 10/1996 | Grube et al. | |
| 5,598,167 A | 1/1997 | Zijderhand | |
| 5,633,644 A | 5/1997 | Schussler et al. | |
| 5,636,123 A | 6/1997 | Rich et al. | |
| 5,751,245 A | * 5/1998 | Janky et al. ........... | 342/357.07 |
| 5,754,429 A | 5/1998 | Ishihara et al. | |
| 5,777,580 A | 7/1998 | Janky et al. | |
| 5,812,959 A | 9/1998 | Froeburg et al. | |
| 5,872,526 A | 2/1999 | Tognazzini | |

(List continued on next page.)

*Primary Examiner*—Michael J. Zanelli
(74) *Attorney, Agent, or Firm*—Knobbe, Martens, Olson & Bear LLP

(57) ABSTRACT

A marine ship tracking system automatically and accurately monitors ship movements utilizing a limited number of reports from a marine ship and is easily installed and operated. Ships utilizing the marine ship tracking system periodically transmit reports to a remote tracking center. A ship sends a report to the remote tracking center when there is a significant change in the ship's movement or position, or if a predetermined amount of time has elapsed since the ship last sent a report to the remote tracking center. The report includes current ship information, such as current position and current movement information. Because the ship sends a report each time a significant change in movement occurs, the remote tracking center may accurately extrapolate the position of the ship between the transmissions of the reports. In this manner, the remote tracking center may retain an accurate history of the ship's position and movements at all times.

22 Claims, 14 Drawing Sheets

U.S. PATENT DOCUMENTS

| | | |
|---|---|---|
| 5,983,161 A | 11/1999 | Lemelson et al. |
| 5,987,377 A | 11/1999 | Westerlage et al. |
| 6,006,159 A | 12/1999 | Schmier et al. |
| 6,049,754 A | 4/2000 | Beaton et al. |
| 6,054,928 A * | 4/2000 | Lemelson et al. ....... 340/573.4 |
| 6,064,335 A | 5/2000 | Eschenbach |
| 6,085,145 A | 7/2000 | Taka et al. |
| 6,124,825 A | 9/2000 | Eschenbach |
| 6,141,611 A | 10/2000 | Mackey et al. |
| 6,144,917 A | 11/2000 | Walters et al. |
| 6,175,329 B1 | 1/2001 | Vicci |
| 6,178,378 B1 | 1/2001 | Leibold |
| 6,185,504 B1 | 2/2001 | Berstis et al. |
| 6,191,708 B1 | 2/2001 | Davidson |
| 6,236,357 B1 | 5/2001 | Corwith |
| 6,249,241 B1 | 6/2001 | Jordan et al. |
| 6,253,148 B1 | 6/2001 | Decaux et al. |

\* cited by examiner

METHOD AND SYSTEM FOR MARINE VESSEL TRACKING SYSTEM

PRIORITY CLAIM

This application is a non-provisional application, which claims the benefit 35 U.S.C. §119(e) of the following applications:

This application claims the benefit of Provisional Application No. 60/290793, filed May 14, 2001, entitled "Systems and Methods for Remotely Monitoring Marine Traffic," the entire content of which is expressly incorporated by reference.

This application claims the benefit of Provisional Application No. 60/299902, filed Jun. 21, 2001, entitled "Systems and Methods for Projecting Maritime Ship Movement," the entire content of which is expressly incorporated by reference.

This application claims the benefit of Provisional Application No. 60/301209, filed Jun. 27, 2001, entitled "Systems and Methods for Remotely Monitoring Marine Traffic," the entire content of which is expressly incorporated by reference.

This application claims the benefit of Provisional Application No. 60/330442, filed Oct. 17, 2001, entitled "Method and System for Marine Vessel Tracking System," entire content of which is expressly incorporated by reference.

This application claims the benefit of Provisional Application No. 60/357752, filed Feb. 14, 2002, entitled "System and Method for Detecting Suspicious Activity by Marine Vessels," the entire content of which is expressly incorporated by reference.

BACKGROUND OF THE INVENTION

1. Field of the Invention

This disclosure generally relates to automatic marine ship tracking systems and methods. More particularly, this disclosure relates to ship tracking systems and methods for accurately monitoring the movement of marine ships utilizing a limited number of transmissions from the marine ships.

2. Summary of the Invention

The preferred embodiments of the present invention relate to marine ship monitoring systems that automatically and accurately monitor ship movements and are easily installed and operated. Unlike conventional marine ship monitoring systems, the marine ship monitoring systems of the present invention automatically and accurately monitor the movements of ships utilizing a limited number of transmissions from the ships, thereby advantageously reducing the costs monitoring the ships. Ships utilizing one of the preferred embodiments transmit a report to a remote tracking center periodically. For example, the ship sends the report to the remote tracking center when there is a significant change in the ship's movement or position, or if a predetermined amount of time has elapsed since the ship last sent a report to the remote tracking center. The report includes current ship information, such as current position and current movement information. Because the ship sends a report each time a significant change in movement occurs, the remote tracking center may accurately extrapolate the position of the ship between the transmissions of the reports. In this manner, the remote tracking center may retain an accurate history of the ship's position and movements at all times.

One aspect of the present invention is a method and apparatus of monitoring suspicious activity by marine ships from a remote location utilizing a limited number of transmissions from marine ships. The method and apparatus define geographic zones and threshold values corresponding to each of the geographic zones. Via a remote tracking center, the method and apparatus receive ship data including a current position of a ship; the ship only sending the ship data to the remote tracking center when a predefined ship tolerance is exceeded. The method and apparatus compare the position data with the geographical zones for determining if the ship is in one of the geographic zones. When the ship is in one of the geographic zones, the method and apparatus select the threshold values corresponding to the geographic zone and analyze the ship data with the threshold values for determining if the ship is undergoing suspicious maneuvers. Further, if the ship undergoes suspicious maneuvers, such maneuvers are flagged for investigation.

Another aspect of the present invention is a further method and apparatus of monitoring suspicious activity by marine ships from a remote location utilizing a limited number of transmissions from the marine ships. The method and apparatus define geographic zones and values corresponding to each of the geographic zones, the values including minimum speed values and change in track values. The method and apparatus define appropriate ship tolerances corresponding to each of the geographic zones. The appropriate ship tolerances include a time tolerance, a speed tolerance and a change in track tolerance. Via a remote tracking center, ship data are received including stored position data, current speed data and current track data from a ship, where the ship has stored ship tolerances and only sends the ship data to said remote tracking center when one of the stored ship tolerances is exceeded. The stored ship tolerances are compared with the appropriate ship tolerances and the appropriate ship tolerances are sent to the ship when the stored ship tolerances are not the same as the appropriate ship tolerances. The current position data is compared with the geographical zones for determining if said ship is in one of the geographic zones. When the ship is in one of the geographic zones, the method analyzes the ship data with the values corresponding to the geographic zone for determining if the ship is undergoing suspicious maneuvers. The method and apparatus also flag the ship for investigation when the ship is undergoing suspicious maneuvers.

Another aspect of the present invention is a further method and apparatus of monitoring suspicious activity of a marine ship utilizing a limited number of transmissions from a ship. Via a tracking center, the changes in the position of a ship are tracked with respect to predefined zones. In the tracking center, the speed threshold values are stored for each of the zones. Via a navigation receiver in the ship, position signals are sent from a transmitter of a position system. In the ship, ship data are monitored, the data including a current ship track and a current ship speed. In the marine ship, the ship data are compared with predefined tolerances and a ship report is sent to the tracking center when the ship data exceeds at least one of the tolerances, the ship report comprising a current ship position, a current ship track and a current ship speed. Via a communication unit in the tracking center, the method and apparatus receive the report from the marine ship. In the tracking center, the method and apparatus compare the current ship position with predefined zones for determining if the position of the marine ship is within one of the zones. In the tracking center, the ship report is analyzed for determining if the ship is undergoing suspicious maneuvers when the position of the marine ship is within one of the zones. The method and apparatus also flag the ship for investigation only when the ship is undergoing suspicious maneuvers.

Another aspect of the present invention is a method and apparatus of identifying environmental violators by utilizing a limited number of transmissions from marine ships. The method and apparatus receive ship reports comprising current position data from at least one ship, where the ship sends the ship reports when current ship data exceeds a predefined tolerance. The ship stores the reports in a storage database. An origination time and an origination point of an environmental spill are inputted. The method and apparatus compare the origination time and the origination point with the ship position reports saved in the storage database. The method and apparatus also select at least one ship that is the most likely ship to have caused the environmental spill.

Another aspect of the present invention is a method and apparatus that aids a ship in distress utilizing a limited number of transmissions from marine ships. The method and apparatus receive ship reports comprising current position data from ships, where the ships sends the ship reports when current ship data exceeds at least one predefined tolerance. The ship reports are stored in a storage database. A last known position of a ship in distress is inputted. The method and apparatus compare the position of the ship in distress with the ship reports stored in the storage database. A ship best suited to aid the ship in distress is selected based upon a plurality of factors, where the plurality of factors include the distance between the ship in distress and the best suited ship, the size of the best suited ship, the current track of the best suited ship and the speed of the best suited ship. The method and apparatus also communicate the position of the ship in distress to the best suited ship.

Another aspect of the present invention is a method and apparatus that projects the progress of a ship utilizing a limited number of transmissions from the marine ship. A model ship voyage is prepared. The method and apparatus store the model ship voyage in a storage database. Ship reports comprising current position data and current speed data are received from a ship when a predefined tolerance is exceeded. The method and apparatus compare the ship report with the model ship voyage. The method and apparatus also compute a planned arrival time of the ship at a final destination based upon the comparison between the ship report and the model ship voyage.

For purposes of summarizing the invention, certain aspects, advantages and novel features of the invention have been described herein above. It is to be understood, however, that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The preferred embodiments of the present invention will be described below in connection with the attached drawings in which.

DETAILED SHIP MONITORING SYSTEM AND METHODS

Although certain preferred embodiments and examples are disclosed below, it will be understood by those skilled in the art that the invention extends beyond the specifically disclosed embodiments to other alternative embodiments and/or uses of the invention and obvious modifications and equivalents thereof. Thus, it is intended that the scope of the invention herein disclosed should not be limited by the particular disclosed embodiments described herein.

I. Marine Ship Monitoring System and Methods

Disclosed herein are marine ship tracking systems. Also disclosed are various methods, including methods for monitoring the positions of marine ships, detecting ships engaged in suspicious activity, identifying environmental violators, coordinating maritime search and rescue efforts and projecting the progress of a ship. As discussed in more detail below, the various approaches of monitoring ships can operate independently or can be used together.

Any method which is described herein is not limited to the exact sequence of acts described, nor is it necessarily limited to the practice of all of the acts set forth. Other sequences of events or acts, or less than all of the events, or simultaneous occurrences of the events, may be utilized in practicing the method(s) in question.

Furthermore, in this description of the preferred embodiments of the present invention, the "track" of a ship is defined as the direction the ship has moved between position fixes of a navigation receiver. Alternatively, the heading of a ship may be used in place of the track. However, other known methods of defining a track not disclosed herein may also be used.

Additionally, in this description of the preferred embodiments of the present invention, the term "speed" of a ship is defined as the distance a ship has traveled between position fixes of a navigation receiver divided by the amount of time elapsed between the position fixes. However, other known methods of defining a speed not disclosed herein may also be used.

A. Preferred Embodiment of Marine Ship Position Tracking System

Figure 1:
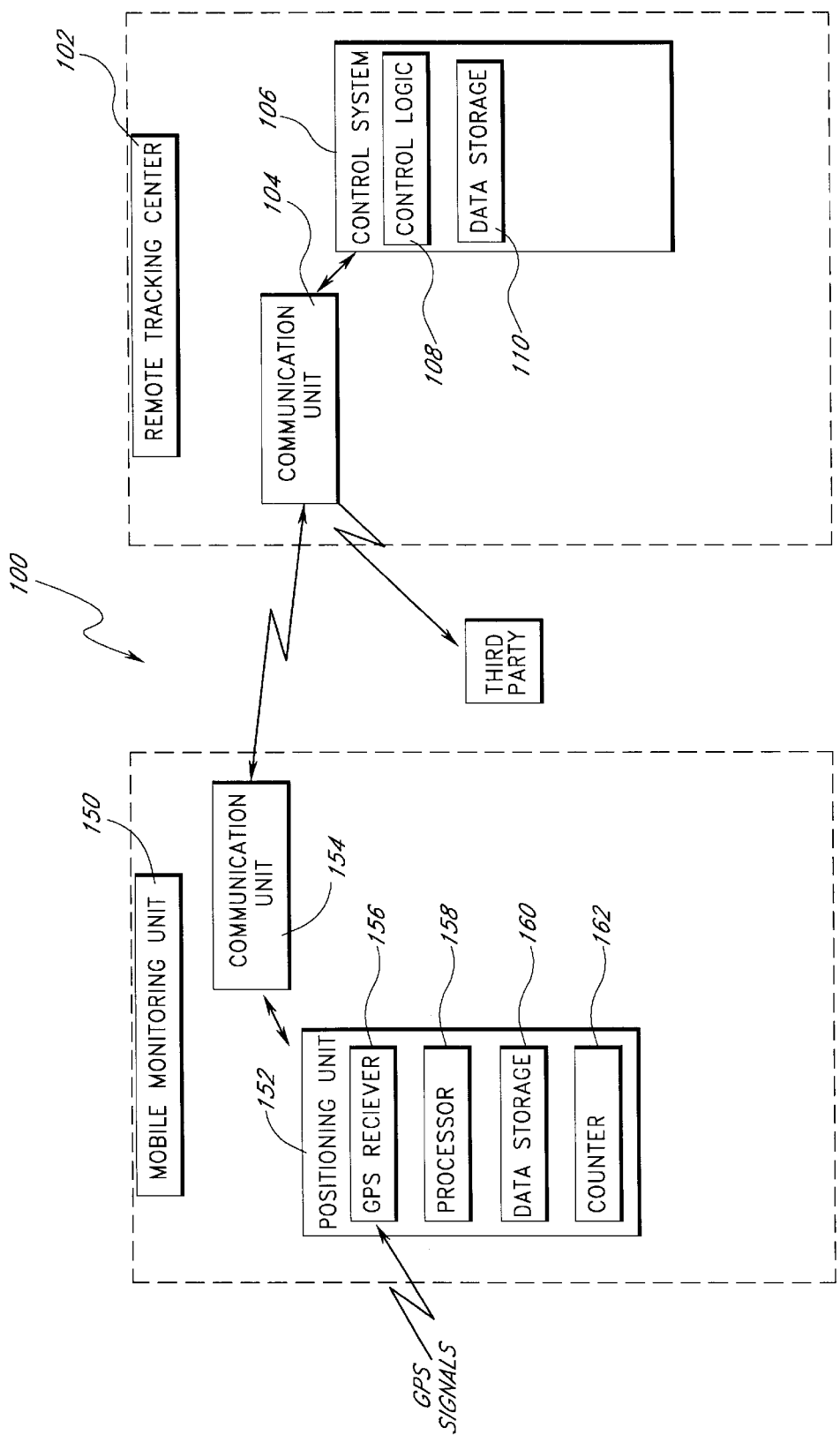
FIG. 1 is a schematic block diagram of the present inventive embodiment of the marine ship tracking system.

FIG. 1 illustrates a block diagram of the marine ship tracking system 100. More specifically, the marine ship tracking system 100 nominally includes a remote tracking center (RTC) 102 and a number of mobile monitoring units (MMU) 150 residing in ships. A significant feature of this embodiment is that it provides a system and method of tracking ships wherein the ships periodically transmit a limited number of reports to a remote center in order to provide an accurate history of a ship's movements and extrapolating an accurate current position of the ship.

1. Remote Tracking Center (RTC 102)

Further to FIG. 1, the RTC 102 advantageously includes a communication unit 104 and a control system 106. The control system 106 includes control logic 108 and data storage 110. The control logic 108 analyzes data received through the communication unit 104 and data stored in the data storage 110 for determining an appropriate course of action. By way of specific example, the control logic 108 may be a computer platform, such as the Compaq Presario laptop Model 1800XL390.

The data storage 110 stores information that the control system 106 uses for analyzing a ship's movement. For example, geographical information and ship information may be stored in the data storage 110. The ship information may include, for example, descriptions of each ship subscribing to the tracking service and a history of each of the ship's movements.

The communication unit 104 allows the RTC 102 to communicate with the MMU 150 located in each subscribing ship. Preferably, the communication unit 104 communicates with the MMU 150 via a satellite communication system. In the preferred embodiment, the communication unit 102 is connected to the Internet and communicates with the MMU 150 via the Inmarsat C Satcom satellite system. By way of specific example, a service of this type is operated by Pole Star Ltd. of the United Kingdom as PurpleFinder.com™. Additionally, the communication unit 104 communicates with third parties interested in receiving reports from the RTC 102. In one embodiment, the communication unit 104 sends email messages over the Internet to third parties, such as government authorities, ship owners or ship operators.

2. Mobile Monitoring Unit (150)

The MMU 150, as shown in FIG. 1, provides position and movement information regarding a marine ship to the RTC 102. The MMU 150 includes a positioning unit 152 and a communication unit 154. The positioning unit 152 generally includes a global positioning system (GPS) receiver 156, a processor 158, a data storage unit 160 and a counter 162. The GPS receiver 156 receives signals from GPS satellites for determining the current position of the ship. By way of example, the GPS receiver 156 may be a 4000Si receiver available from Trimble Navigation Ltd. located in Sunnyvale, Calif. The GPS receiver 156 continuously receives signals from the GPS satellite system for analysis by the processor 158. Alternatively, a trigger (not shown) may activate the GPS receiver 156 so that the positioning unit 152 automatically receives position updates periodically.

The processor 158, which may include for example a 68HC11 processor available from Motorola, Inc., analyzes the position data received from the GPS receiver 156 with data stored in the data storage 160. The processor 158 advantageously determines, for example, the current speed of a ship, the amount of time since a ship last transmitted a report to the RTC 102 and the distance that a ship has traveled since the ship last transmitted a report to the RTC 102. The processor 158 compares these values with tolerances stored in the data storage 160. If the one of the values exceeds a tolerance, then a report is sent to the RTC 102.

The data storage 160 stores data that will aid in determining when the MMU 150 should send the next report to the RTC 102. For example, the data storage 160 electronically saves predefined tolerances. Optionally, the data storage 160 may also store a history of the movement of the ship, such as the position of the ship, the speed of the ship and the track of the ship.

The counter 162 counts the time between reports being transmitted to the RTC 102. In general, if the time between reports exceeds a tolerance, the MMU 150 automatically sends a new report to the RTC 102 containing updated information.

Further to FIG. 1, the MMU communication unit 154 allows the MMU 150 to communicate with the RTC 102 and automatically transmit reports to the RTC 102 for updating the actual position and movement of the ship. As discussed above, the MMU 150 preferably communicates with the RTC 102 via a satellite communication system.

The positioning unit 152 advantageously incorporates existing hardware already present on most commercial ships. In some embodiments, adding new software to the existing hardware on a commercial ship is the only modification necessary to provide the features of the positioning unit 152.

However, the positioning unit 152 is advantageously tamper proof. Consequently, because the existing GPS system on board a ship is not considered tamper proof, it may be removed from a ship and conveniently replaced by a tamper proof positioning unit 152. The removed GPS system may then be converted into a tamper proof positioning unit 152 and subsequently replace a GPS system on a different ship. In this manner, the positioning units 150 may be quickly and cost effectively installed on ships utilizing the ship tracking system 100 (also referenced herein as "subscribing ships").

3. General Operation of the Ship Tracking System 100

Figure 2:
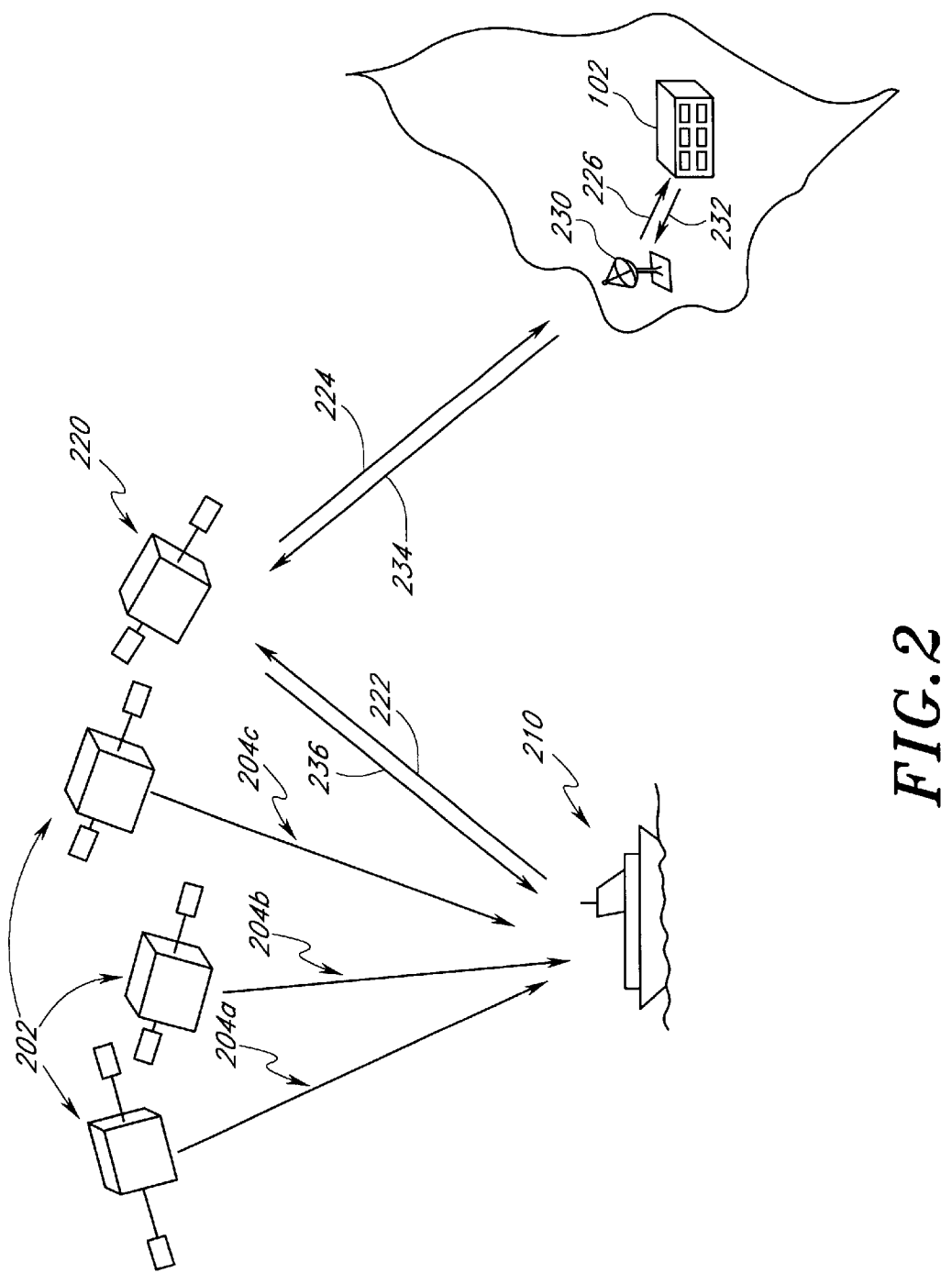
FIG. 2 is a schematic illustration of the transmission paths used in the preferred embodiment of the ship tracking system.

The operation of a first, general embodiment of the ship tracking system 100 will be described in detail with reference to FIGS. 2–4. FIG. 2 illustrates the communication paths between the various systems used in the ship tracking system 100. A GPS satellite system 202 transmits data over transmission paths 204a, 204b, 204c to a subscribing ship 210. The ship 210 receives the data from the GPS satellite system 202 and processes the information to obtain an accurate position.

The ship tracking system 100 uses a further satellite system 220 to communicate between the RTC 102 and the MMU 150. The ship 210 sends data to the RTC 102 through a data transmission path 222 to the satellite 220, which is then sent to a satellite receiving/transmission station 230 through a transmission path 224 and is received by the RTC 102 through a transmission path 226. Conversely, the RTC 102 sends data through transmission path 232 to the receiving/transmission station 230, which then sends the data through a data transmission path 234 to the satellite 220 and is received by the ship 210 through a data transmission path 236. Preferably, the data transmission paths 226 and 232 are over a dedicated land line.

Optionally, the RTC 102 may also send messages to third parties (not shown). In a preferred embodiment, the RTC 102 automatically sends the third party an email containing desired information about a ship when needed. For example, the RTC 102 may automatically send an email to a ship's owner when a ship is a predefined distance from a destination port.

Figure 3:
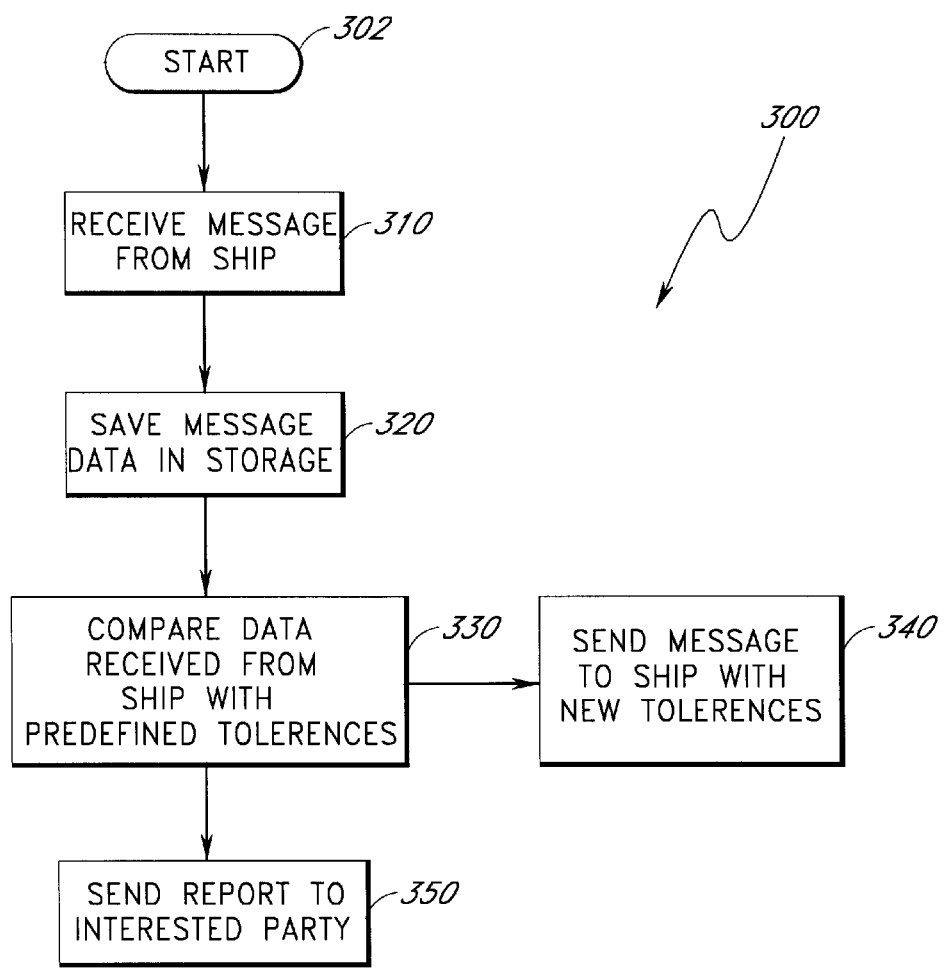
FIG. 3 illustrates a preferred series of steps for monitoring movement of a marine ship used by a remote tracking center.

FIG. 3 graphically depicts the algorithm 300 generally used by the RTC 102 of the ship tracking system 100. After Start 302, the RTC 102 receives a report from a subscribing ship in Step 310. As discussed above, the report is preferably sent from a ship via a satellite communication network to the RTC 102. The RTC 102 then saves the data contained in the report in the data storage 110 of the MMU 150 in Step 320.

Next, in Step 330, the control logic 108 of the RTC 102 compares the data received from the MMU 150 with tolerances stored in the data storage 110. Advantageously, various tolerances may be used so that the desired monitoring aspects of the present invention are achieved. Generally, various combinations of tolerances are used for accomplishing a user's intended purpose. These tolerances may include speed values, distance values, geographic boundaries, time values and change in track values. Preferably, the tolerances are defined by experienced and qualified ships' masters for each different category of ship using the tracking system 100. The tolerances will be described in further detail in the descriptions of further embodiments disclosed herein.

Based upon the comparison performed in Step 330, the control logic 108 determines if the RTC 102 should send a message to the subject ship with a new set of ship tolerances (Step 340). Generally, the RTC 102 sends the MMU 150 new tolerances if it is desired that the ship have tightened tolerances or loosened tolerances. For example, if it is desired to know a relatively accurate position of a ship, then the MMU 150 should have tighter tolerances. Conversely, if it is desired to merely have a general position of the ship, then the MMU 150 should have looser tolerances.

Additionally, based upon the results of the comparison performed in Step 330, the control logic 108 determines if the RTC 102 should send a message to a third party (Step 350). Generally, a message will be automatically sent to a third party if a predefined tolerance is exceeded, such as an email to ship owners notifying them that their ship is a predefined distance away from a destination port.

Figure 4:
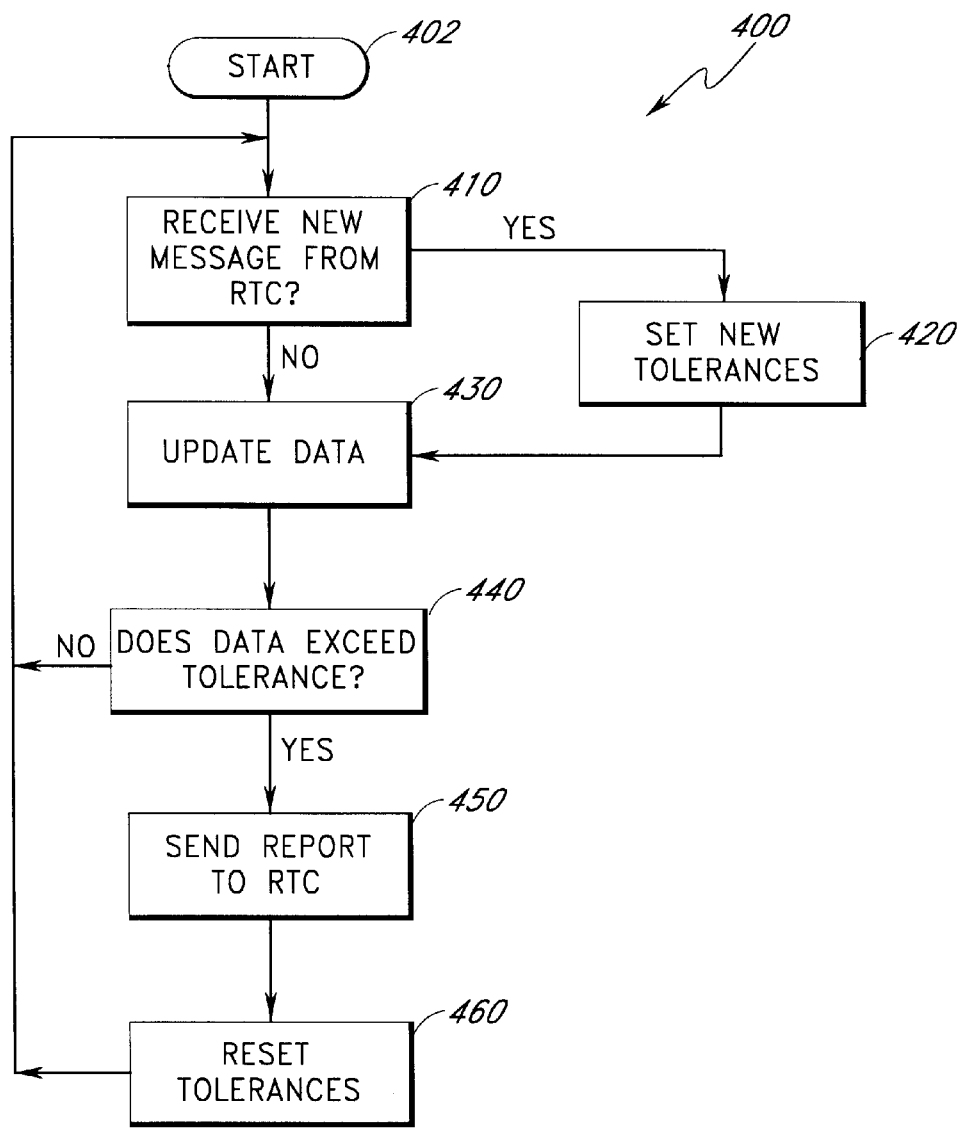
FIG. 4 illustrates a preferred series of steps for monitoring movement of a marine ship used by a mobile monitoring unit located in marine ship.

Furthermore, FIG. 4 graphically depicts a preferred algorithm 400 used by the MMU 150 of the ship tracking system 100. After Start 402, the MMU 150 determines if a new message has been received from the RTC 102 containing new tolerances (Step 410). If a report has been received containing new tolerances, then the Yes path is followed to Step 420. In Step 420, the MMU 150 sets the tolerances according to the new tolerances received in the report from the RTC 102.

After the tolerances are set in Step 420, or if the No path is followed from Step 410, the MMU 150 updates the ship's movement data in Step 430. The updated movement data includes, for example, GPS readings received from the GPS receiver 156 and timer readings obtained from the counter 162. These readings are then analyzed by the processor 158 and compared to the tolerances in Step 440. If none of the tolerances are exceeded, then the process is repeated, beginning at Step 410.

If one or more of the tolerances are exceeded, then a report is sent to the RTC 102 updating the ship's position and movement in Step 450. After the report is sent, the tolerances are reset, if needed in Step 460 and the process is repeated from Step 410.

Advantageously, the above-described ship tracking system 100 may be applied in many different ways for monitoring ships. In many cases, the same components of the marine ship tracking system 100 may be used, with only additional steps used in the operation of the ship tracking system 100. Below are second, third, fourth and fifth embodiments of the marine ship tracking system 100 that use the same components as described above, but use additional steps in the operation for accomplishing each respective function.

II. Suspicious Activity Embodiments

Generally, a second embodiment of the present invention is a more specific application to the above-described first, general embodiment. The second embodiment incorporates predefined zones of suspicious activity into the first embodiment for monitoring suspicious activity, such as potential smuggling or terrorist activity. However, the types of monitored activity are not limited to smuggling or terrorist activity, but instead may be used for other types of monitoring applications not disclosed herein.

Furthermore, the second embodiment may advantageously use the ship tracking system 100 disclosed above. The second embodiment would then further include the use of the predefined zones of suspicious activity in the operation of the ship tracking system 100.

The predefined zones of suspicious activity are advantageously defined by experts, such as law enforcement officials, based upon information that the zones have a significant potential for terrorist or smuggling activity. The geographical boundaries of these zones are entered into the RTC data storage 110 for comparing the position of the ships relative to the zones. If the position of a ship is in one of the zones, then the RTC 102 takes a responsive course of action, such as sending tighter tolerances to the MMU 150 installed in the ship or determining if the ship is engaged in conduct that indicates suspicious activity.

Figure 5:
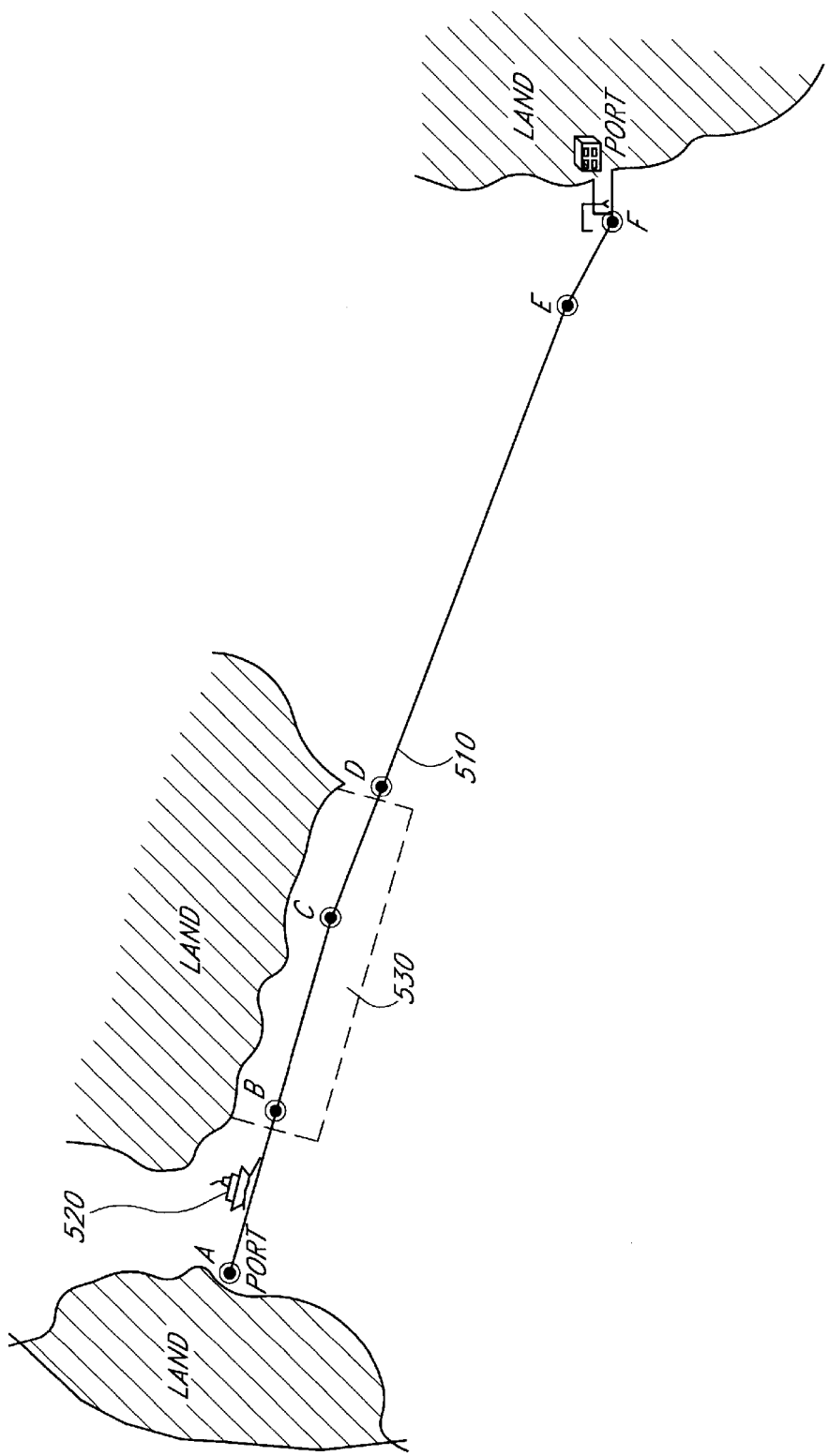
FIG. 5 is an illustration of an example route of a ship using the suspicious activity identification embodiment of the present invention.

The operation of the second embodiments of the ship tracking system 100 will be described in detail with reference to FIGS. 5 and 6. FIG. 5 graphically depicts an exemplary voyage route 510 traveled by a marine ship 520. In this example, the ship 520 leaves a port A and arrives at a port F. Along the voyage route 510, the ship 520 travels through a zone 530 that has been predefined as an area of suspicious activity.

Throughout the voyage, the ship automatically sends reports to the RTC 102 for monitoring the ship's movement. Thus, at some point in time after the ship 520 travels into the predefined zone, referenced as point B, the ship 520 sends a report to the RTC 102. The RTC 102 analyzes the information contained in the ship's report, and determines that the position of the ship 520 is in the predefined zone of suspicious activity 530.

Generally, once the RTC 102 determines that a ship is in a predefined zone of suspicious activity, the RTC 102 sends the ship's MMU 150 tighter tolerances so that the RTC 102 can better monitor whether the ship may be engaged in suspicious activity. More specifically, the RTC 102 monitors indications suggestive of suspicious activity, such as whether the monitored ship is moving in a manner favorable to a boarding opportunity by another ship or a helicopter. For example, data suggestive of boarding includes the speed of the ship below a predefined value or the ship changing its track into the wind. Preferably, experts, such as law enforcement officials, predefine a ship's tolerances based upon the type of the ship and the conditions in the predefined zone. Thus, various predefined tolerances may be defined for each subscribing ship. Furthermore, the tolerances advantageously take into account the amount of traffic normally present in the zone, the speed the particular type of ship normally travels in the zone and the track the ship would normally travel in the zone. Preferably, tighter tolerances include a shorter duration between transmission of reports to the RTC 102, a threshold speed that the ship may travel before triggering a report to be sent to the RTC 102 and a smaller change in the ship's track before sending a report to the RTC 102.

As noted above, use of information sent in a position report to the RTC 102 may reveal maneuvers suggestive of boarding or onloading cargo without the ship stopping or even slowing significantly. However, since boarding is difficult when a ship's track is not heading into the wind or concomitant waves, it is possible to monitor the ship's track relative to local wind as an indicator of boarding/loading activities at sea. Therefore, the RTC 102 advantageously compares the track of a monitored ship in a predefined zone of suspicious activity with the direction of the wind and waves.

Optionally, multiple sets of tolerances may be used for zones of suspicious activity having varying navigation conditions. Thus, for example, the RTC 102 may send the ship 520 a first set of tolerances when the ship first enters the zone 530 and a second, different set of tolerances at a later time while the ship is still in the zone 530.

Further to FIG. 5, the ship 520 travels through the predefined zone 530, all the while periodically sending reports to the RTC 102. At reference point C, the ship 520 sends a report to the RTC 102. The RTC 102 analyzes the report and determines that the ship has performed a maneuver which indicates suspicious activity, such as the ship 520 traveling at a speed below the predefined speed threshold value or a significant change in track into the wind. In response, the RTC 102 sends a report to the appropriate third party responsible for investigating potential terrorist activity on ships, such as the coast guard.

Position D of FIG. 5 illustrates that the ship 520 has entered the predefined zone 530. Upon receipt of a report at the RTC 102 at reference point D, the RTC 102 analyzes the report and recognizes that the ship 520 is no longer in the zone 530. Consequently, the RTC 102 sends the ship new, looser tolerances because the ship is no longer in a zone of suspicious activity. However, in one embodiment, the RTC 102 maintains tight tolerances on the ship 520 at all times after the ship 520 has performed a maneuver indicating suspicious activity for closely monitoring any further suspicious activity.

Position E of FIG. 5 illustrates that the ship 520, having engaged in suspicious activity, is commanded to anchor away from the destination port F, and directed to anchor at reference point E. A third party, such as the coast guard, may then inspect the ship and question the crew before the ship docks at the port F. In this manner, the third party may determine if hazardous materials or other contraband are on the ship 520 before the ship 520 is close to the port F, where the hazardous material or other contraband could cause significant damage or be quickly offloaded.

Additionally, if the third party determines that the ship 520 is safe, then the ship 520 may dock and unload its cargo at the destination port F.

Figure 6:
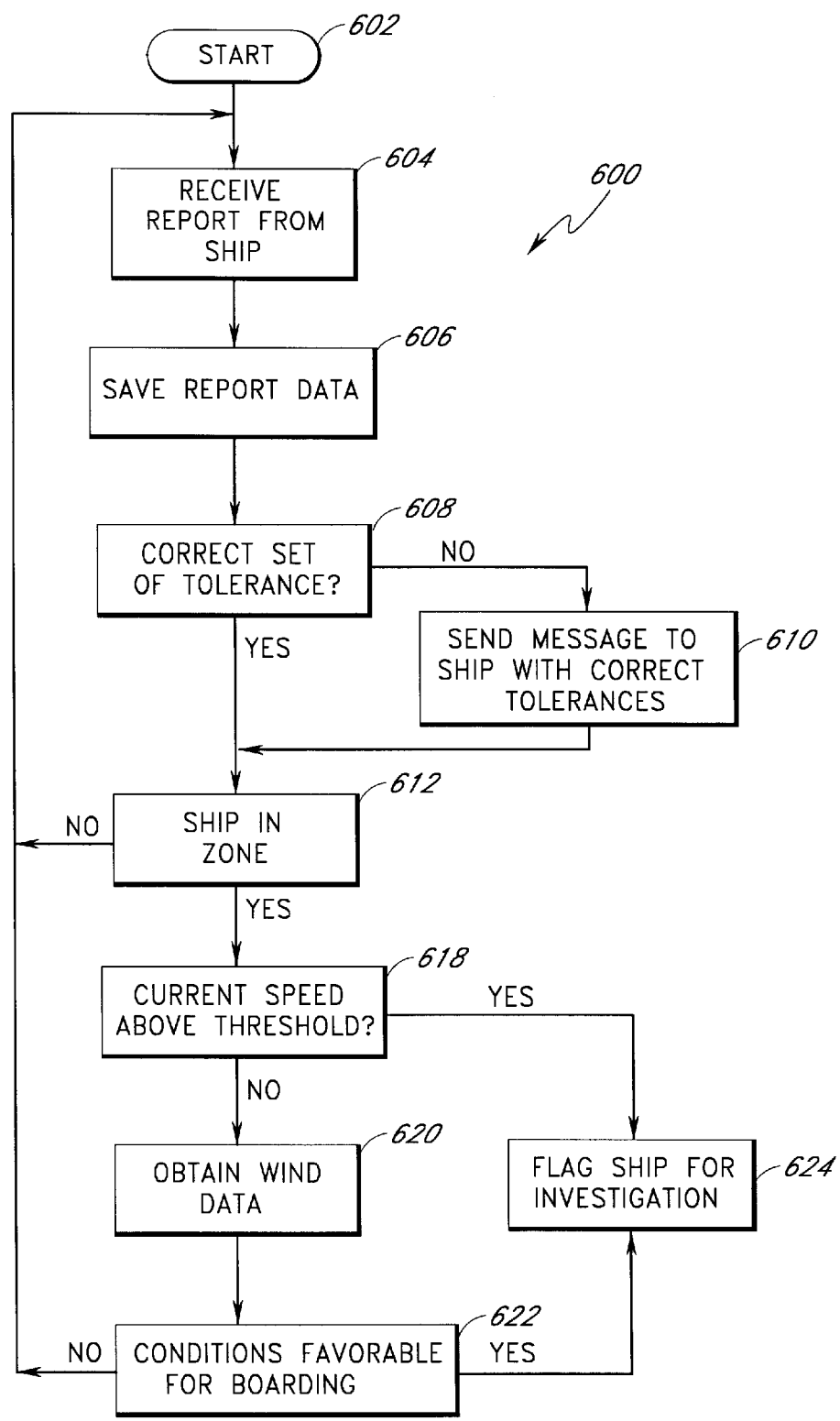
FIG. 6 illustrates a preferred series of steps for monitoring suspicious activity of marine ships.

FIG. 6 graphically depicts the algorithm 600 used by the second embodiment to monitor suspicious activity. After start 602, the RTC 102 receives a report from a ship in step 604. The RTC 102 then saves the data received in the report in the data storage 110 in Step 606.

Next, in Step 608, the RTC 102 determines if the ship currently has a correct set of tolerances. As discussed above, experts advantageously define tolerances for each geographic region based upon various factors. For example, zones of suspicious activity generally have tighter tolerances than other geographic regions. Thus, in Step 608, the RTC 102 compares the current set of tolerances stored in the subject ship (which may be determined from the last set of tolerances the RTC 102 sent to the ship) with the tolerances defined for the geographic region the ship is currently traveling through. For example, if the ship has sent its first report since entering a predefined zone of suspicious activity, then the RTC 102 will likely determine that the subject ship requires new tolerances because zones of suspicious activity commonly require tighter tolerances. Accordingly, the RTC 102 will send a message to the ship containing the new tolerances in Step 610 if new tolerances are required. In contrast, the No path is followed to Step 612 if the RTC 102 determines that the subject ship does not require new tolerances.

The RTC 102 determines if the subject ship is in a predefined zone of suspicious activity in Step 612. Here, the RTC 102 preferably uses position data contained in the report sent from the ship. The RTC 102 compares the position data with the stored boundaries of the predefined zones of suspicious activity. If the position of the ship falls within a predefined zone of suspicious activity, then the Yes path is followed. In contrast, if the position of the ship does not fall within a predefined zone, then the NO path is followed to Step 604 and the process is repeated.

If the Yes path is followed from Step 612, the RTC 102 then analyzes the data contained in the ship's report for suspicious activity in Steps 618–630. In the preferred embodiment, the RTC 102 analyzes the speed of the ship (Step 618) and the track of the ship (Steps 620–622) for suspicious activity. The Steps 618, 620, and 622 may be performed sequentially (as shown in FIG. 6), or the steps may be performed simultaneously.

In step 618, the RTC compares the current speed of the ship with a predefined minimum speed. Advantageously, the predefined minimum speed is determined for each type of ship, as determined by qualified ships' masters or other experts in the field. Generally, the minimum speed is based upon the maximum speed the respective class of ship normally travels when being boarded by another ship. If the current speed is below the predefined minimum speed, then the Yes path is followed to step 624. In contrast, if the current speed is above the predefined minimum speed, then the No path is followed.

If the No path is followed, then the RTC 102 compares the track of the ship and the speed of the ship with the current wind data in steps 620 and 622. First, in Step 620, the RTC 102 obtains current wind data in the geographical proximity to the subject ship. Next, in Step 622, the RTC 102 analyzes the direction of the wind and strength of the wind with the current ship track and the current ship speed and determines if the conditions are favorable for a boarding opportunity. Advantageously, ships' masters and other experts in the pertinent field predefine conditions for a boarding opportunity which are stored in the data storage 110. If the conditions are favorable for a boarding opportunity, then the Yes path is followed. If the conditions are not favorable for a boarding opportunity, then the No path is followed to Step 604.

Additionally, in one embodiment, the RTC 102 contains data that allows the RTC 102 to discriminate between a possible helicopter boarding opportunity and boarding opportunity by another ship. Again, ships' masters and other experts in the pertinent field predefine the conditions favorable for a helicopter boarding opportunity and a ship boarding opportunity.

If the Yes path is followed to step 624, then the RTC 102 flags the ship for investigation and reports the ship to the appropriate third party. For example, the RTC 102 may send an email to government authorities responsible for checking incoming ships for contraband. The authorities may then inspect the ship and question the ship's crew regarding the suspicious ship movements. Furthermore, the authorities may require that the ship anchor away from the port in the event that the ship has dangerous material on board, such as explosives or toxic chemicals.

III. Identification of Environmental Violators Embodiments

Figure 7:
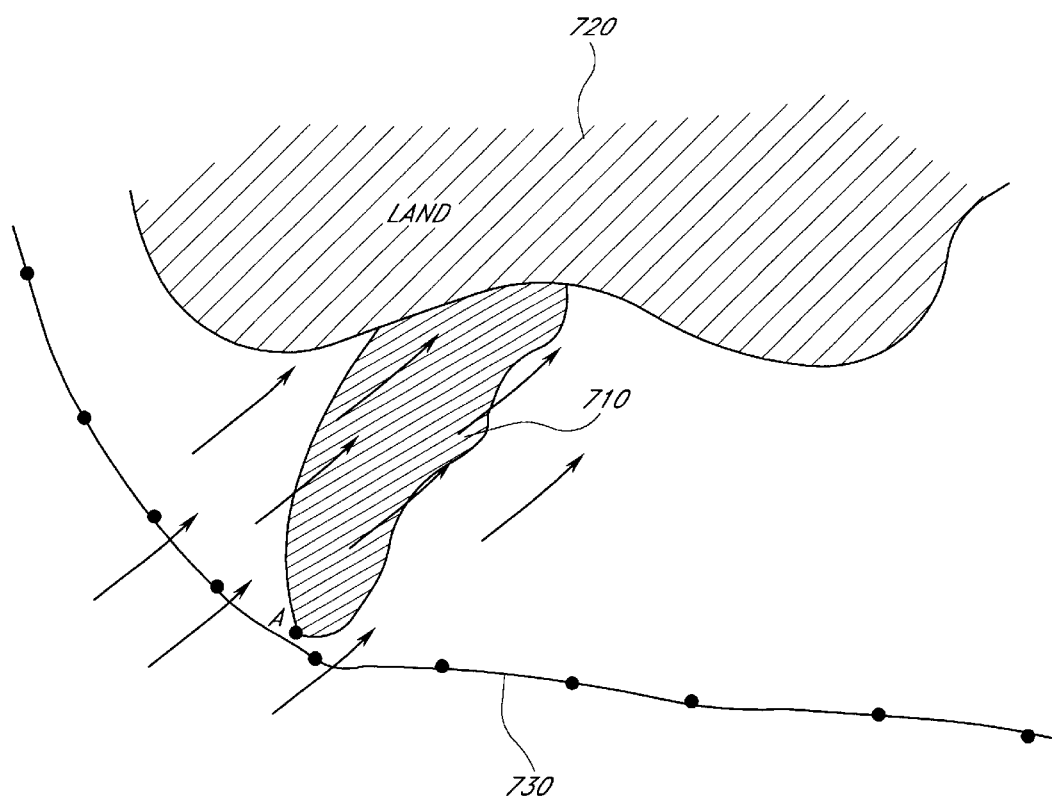
FIG. 7 is an illustration of a sample map of an environmental spill and a route of a ship that is using the identification of environmental violator's embodiment of the present invention.
Figure 8:
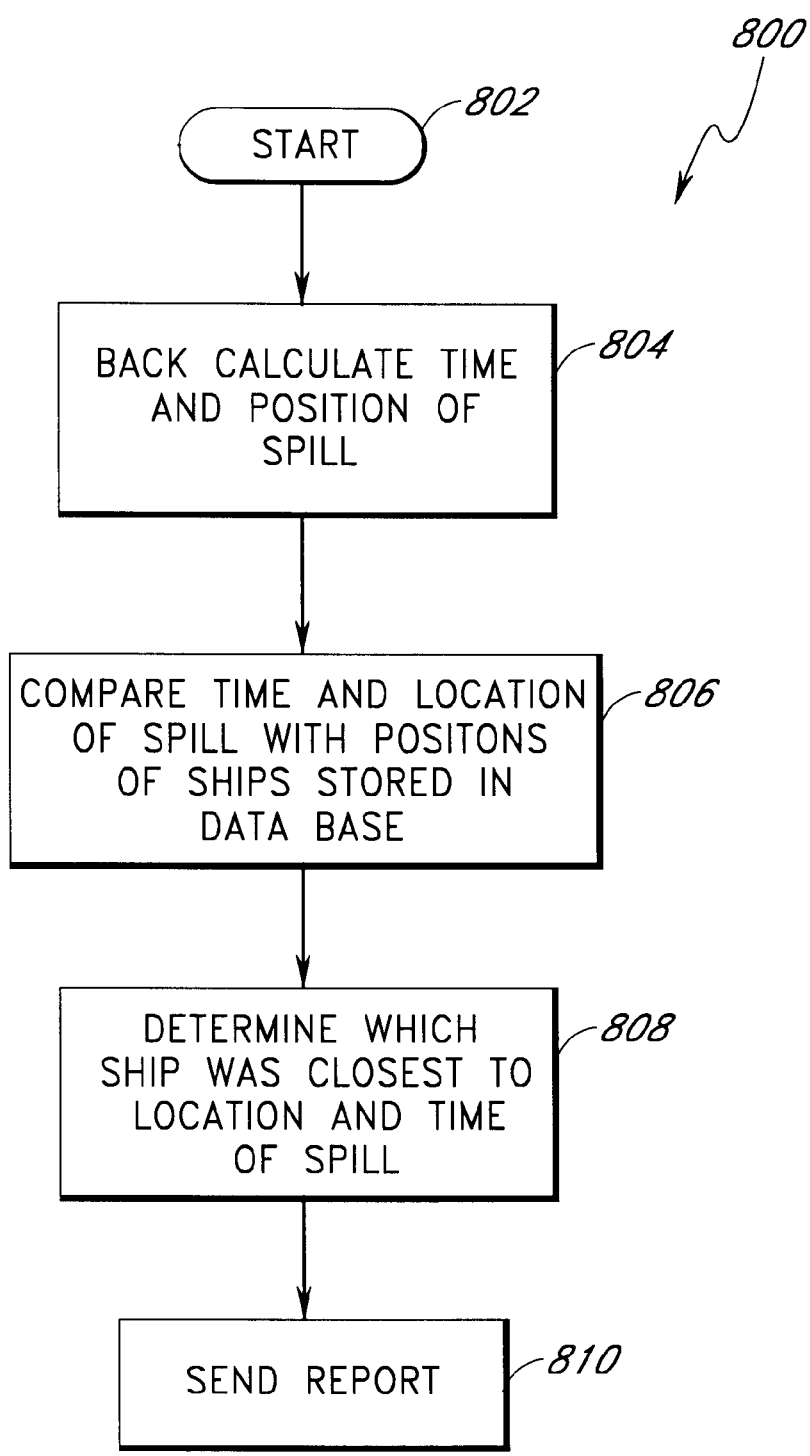
FIG. 8 illustrates a preferred series of steps for identifying environmental violators.

A third embodiment of the ship tracking system 100 in accordance with the present invention is illustrated in FIGS. 7 and 8. Generally, the third embodiment identifies environmental violators by backtracking a ship's voyage route to determine if the ship was near the origination point of an environmental spill at the time of the spill. Advantageously, the ship tracking system 100 stores a history of the positions of each subscribing ship in the RTC data storage 110. Once the origination position and time of the environmental spill is determined, the RTC 102 compares the origination time and position of the spill with the stored histories of each of the subscribing ships. The RTC 102 then determines the most likely ship or ships that may have caused the spill based upon the proximity of the ship or ships to the origination point and time of the spill.

Furthermore, the third embodiment advantageously utilizes the same system and methods that are utilized in the first, general preferred embodiment (shown in FIGS. 1–4). However, the operation for third embodiment additionally comprises the steps of: first, using knowledge of tidal currents to backtrack the location time of an environmental spill; and second, using the RTC storage database 110 containing the histories of ships' movements to determine which ship or ships were closest to the origination point and time of the environmental spill.

FIG. 7 depicts an exemplary area of an environmental spill 710. The origination point of the environmental spill 710 is referenced as point A. Here the environmental spill 710 has extended toward the shore of a landmass 720. The tidal currents are depicted as arrows and illustrate that the tidal currents are heading toward the shore of the landmass 720.

FIG. 7 further shows a route 730 traveled by a ship using the ship tracking system 100. Each position of the ship where the ship sent the RTC 102 a report is shown by a dot along the route 730.

Through the use of the knowledge of the tidal currents' heading and speed, an origination point A and an origination time of the spill 710 is calculated. The origination point A and time of the spill 710 are then compared with the stored positions of the subscribing ships. The RTC 102 determines that the ship travelling along the route 730 was the closest in proximity to the calculated origination point A at the calculated time of the spill 710. The RTC 102 then notifies the proper third party, such as law enforcement officials, that the subject ship was the likely cause of the environmental spill 710. The third party may then examine the ship and question the ship's crew regarding the environmental spill 710.

Furthermore, the ship tracking system 100 advantageously stores all the data sent from a ship to the RTC 102, such as the position, time, track and speed of the ship. Through the use of the stored data, the RTC 102 can also back track an accurate history of the position of the ship at all times. Consequently, even if a first ship's closest reported position to the environmental spill is a further distance away from a second ship's closest reported position, the third embodiment may backtrack the first ship's route and determine that the first ship was actually closer than the second ship to the origination point A of the spill at the time of the spill.

FIG. 8 graphically depicts the algorithm 800 used by the third embodiment to identify environmental violators. After the start 802 of the algorithm, the time and position of the environmental spill is calculated 804. In a preferred embodiment, the RTC 102 uses knowledge of the tidal currents near the location of the spill to backtrack the origination time and position. In an alternative embodiment, the time and position of the spill is calculated by a third party, such as by law enforcement officials. In the alternative embodiment, the calculated time and position of the spill are then inputted into the ship tracking system 100. Once the time and location of the spill is determined, the RTC 102 compares the spill time and location with the ship movement data stored in the data storage 110 (Step 806). The most likely ships to have caused the spill are then determined based upon the stored movement data in Step 808. A message is then sent to the appropriate third party, such as law enforcement officials, with a list of the ships that most likely caused the environmental spill (Step 810).

IV. Search and Rescue Embodiments

Figure 9:
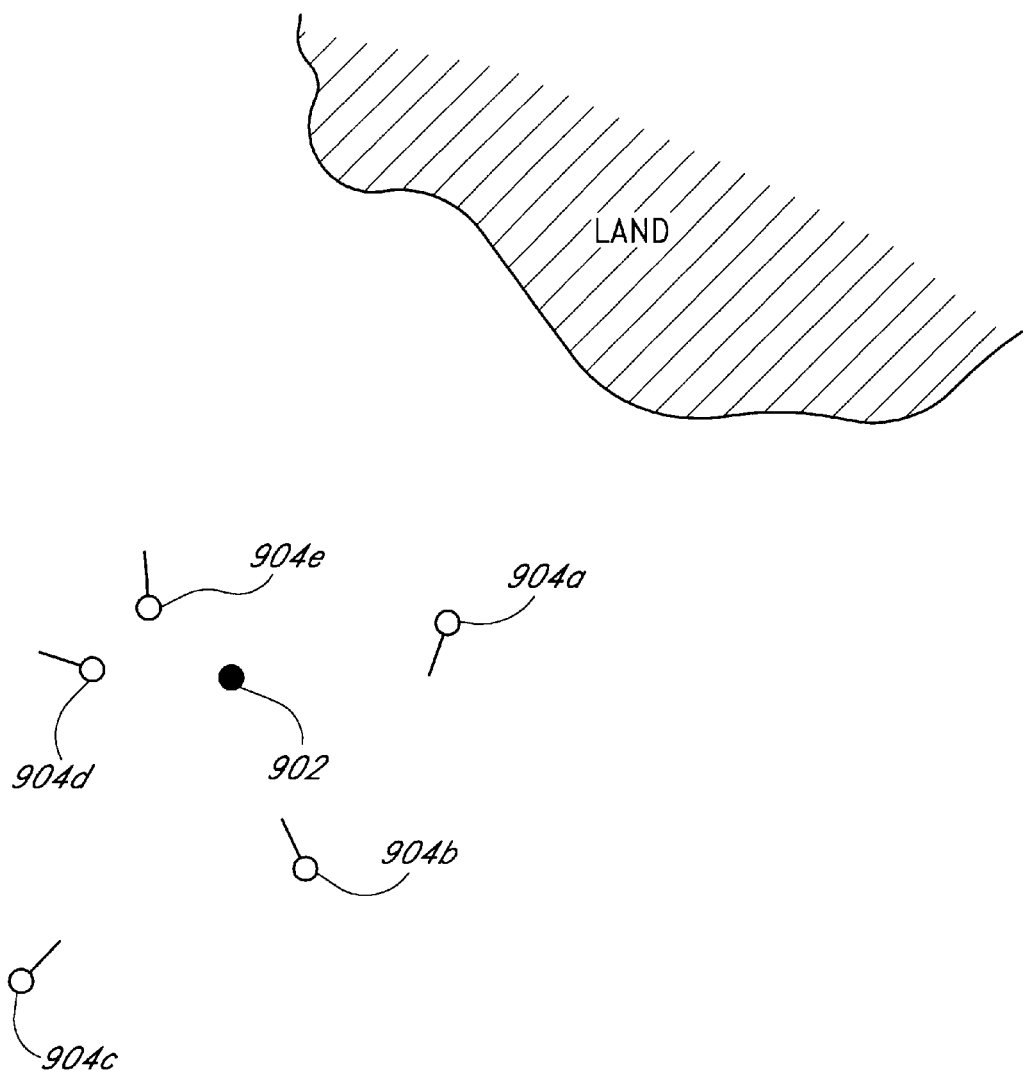
FIG. 9 illustrates an exemplary map of a ship in distress and other ships in proximity to the ship in distress.
Figure 10:
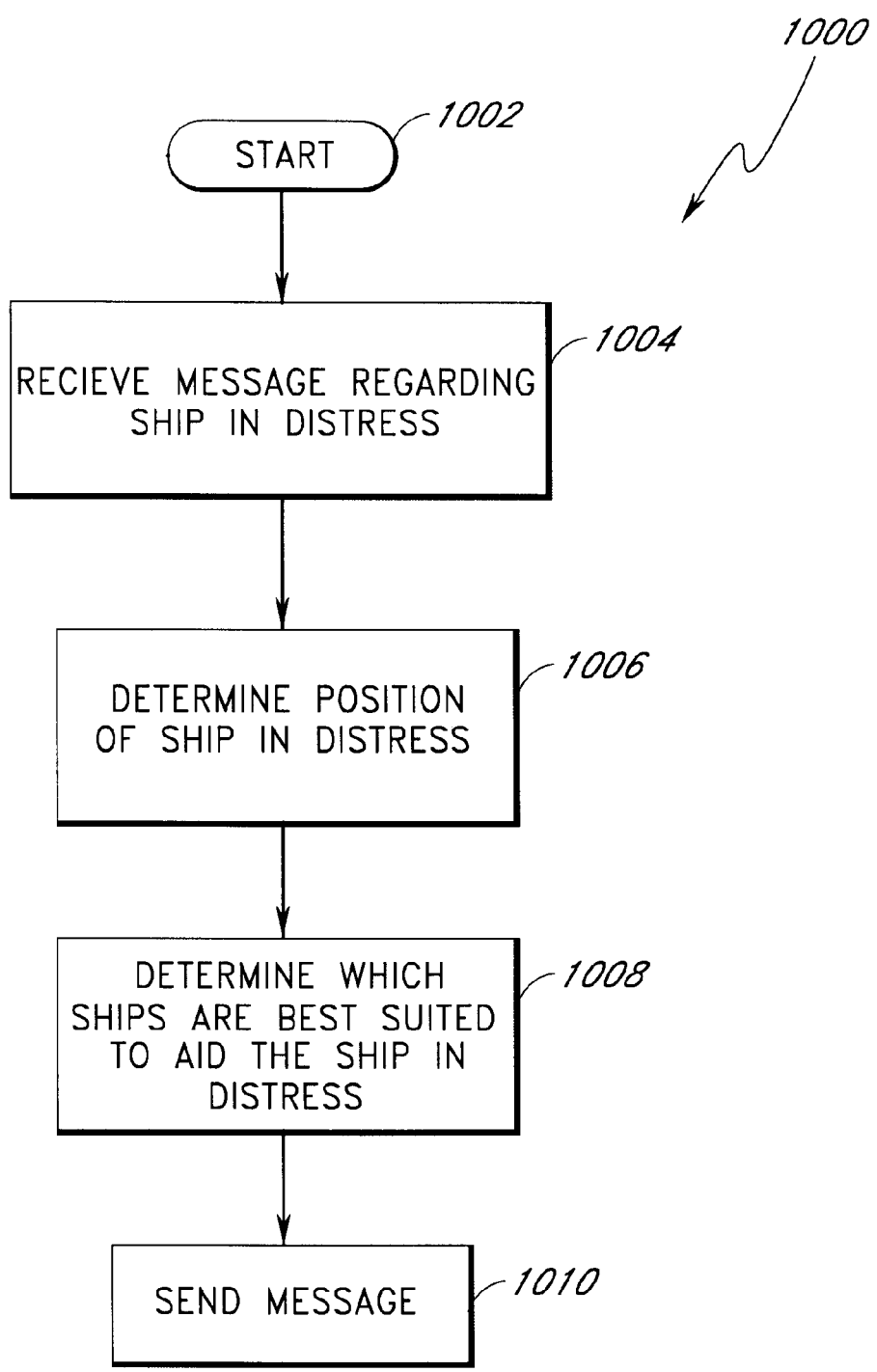
FIG. 10 illustrates a preferred series of steps for aiding a ship in distress.

A fourth embodiment of the ship tracking system 100 is illustrated in FIGS. 9 and 10. Generally, the fourth embodiment aids in search and rescue efforts by advantageously utilizing the reports sent by the subscribing ships to determine which ship or ships are best suited to aid a ship in distress. More specifically, the fourth embodiment compares the position of a ship in distress with data stored in the RTC data storage 110 for determining which ship or ships are best suited to aid the ship in distress. For example, the fourth embodiment preferably considers factors for determining which ships are best suited to aid the ship in distress, such as: which ships are closest to the ship in distress, which ships would be able to reach the ship in distress within the shortest amount of time and which ships are capable of actually aiding the ship in distress.

Furthermore, the fourth embodiment advantageously utilizes the same system and methods that are utilized in the first, general preferred embodiment (shown in FIGS. 1–4). However, the operation for fourth embodiment additionally comprises the step of comparing the position of a ship in distress with data stored in the RTC data storage 110 for determining which ship or ships are best suited to aid the ship in distress.

Optionally, the fourth embodiment may also support the existing AMVER system sponsored by the United States Coast Guard for assisting in search and rescue efforts. The fourth embodiment may advantageously electronically interface directly to the existing AMVER system computers and continuously provide accurate position tracking without human reporting or data entry, and therefore, minimizing error.

FIG. 9 is an exemplary illustration of a ship under distress 902 and ships 904 (*a–e*) in the proximity of the ship in distress. Each of the ships 904 (*a–e*) have a velocity vector illustrating the heading and speed of the ship, depicted as a line extending from the ship.

Using the search and distress aspect of the ship tracking system 100, the RTC 102 is notified that the ship 902 is in need of assistance. The RTC 102 may be notified by the ship 902 or may be notified by a third party, such as the coast guard. The RTC 102 determines the closest ships 904 (*a–e*) to the ship in distress 902 and determines which ship is best suited to aid the ship in distress 902. For example, as shown in FIG. 9, the ship 904*e* is closer to the ship 902 than any of the other ships 904 (*a–d*). However, the ship 904*e* is heading away from the ship 902. Conversely, ship 904*b* is further away from ship 902 than the ship 904*e*. However, the ship 904*b* is heading in the direction toward the ship 902. Thus, the tracking system 100 may determine that the ship 904*b* is the better suited ship to aid the ship 902 than is the ship 904*e* because ship 904*b* will not have to significantly change its heading.

Furthermore, the ship tracking system 100 utilizing the search and rescue aspect preferably additionally analyzes the maneuverability characteristics and size of each of the ships 904 (*a–e*) to factor in which ship is best suited to aid the ship 902. For example, the ship 904*d* is heading away from the ship 902, however, the ship 904*d* may be highly maneuverable and be able to turn around and aid the ship 902 sooner than any of the other ships 904(*a–c* or *e*). Moreover, some of the ships 904(*a–e*) may be too small to adequately help the ship 902. Thus, the ship tracking system 100 preferably analyzes the size of each of the ships 904(*a–e*) for determining if each of the ships 904(*a–e*) are capable of helping the ship 902.

FIG. 10 graphically depicts the algorithm 1000 used by the tracking system 100 to aid in search and rescue efforts. After the start 1002 of the algorithm 1000, a message is received by the RTC 102 from a ship in distress (Step 1004). If the ship is a subscribing ship, and the report does not contain the current position of the ship, then the RTC 102 looks up the last know position sent to the RTC 102 by the ship in distress. If the report does contain the current position of the ship, then the current position contained in the message is inputted into the RTC control system 106.

Once the ship tracking system 100 identifies the most current known position of the ship in Step 1006, the position of the ship is compared with data stored in the data storage 110 to determine which ship is best suited to aid the ship in distress (Step 1008). In general, the ships most suited to help out the ship in distress are the ships that can reach the ship in distress the fastest and have the capabilities to actually aid the ship in distress. Preferably, factors such as distance from the ship in distress, track of the ship, speed of the ship, the size of the ship and the maneuverability of the ship are analyzed to determine which ship is best suited to help the ship in distress.

Once the ship or ships that are best suited to aid the ship in distress are determined, the best suited ships are contacted and asked to help the ship in distress (Step 1010). In a preferred embodiment, and the RTC 102 sends an email message containing a list of the best suited ships to a third party, such as the coast guard or other government agency. The third party then contacts the ships and asks the ships to help in the search and rescue effort.

V. Projecting the Process of a Marine Ship Embodiments

A fifth embodiment of the ship tracking system 100 is illustrated in FIGS. 11–14. Generally, the fifth embodiment compares a predefined model voyage of a ship with the actual progress of the ship to produce an automatic, continuing updated projection of the ship's arrival time.

Generally, differing models for future position may be applied depending upon whether a ship's progress is currently ahead of a planned schedule or behind of a planned schedule, and whether the ship is currently above or below planned speed. Additionally, models may, for example, account for weather patterns, ocean currents or other factors that may cause a ship to arrive at a destination port ahead or behind of schedule. Furthermore, preferably the model may change or account for a ship choosing a new route due to, for example, avoiding weather conditions or traffic.

After the plot of positions is calculated using these models, they are preferably displayed in a format for easy comprehension by the user. The display plots time ahead of planned schedule on the vertical axis of a two axis plot and distance/time-to-go on the horizontal axis. In this manner, trends toward or away from the planned schedule become immediately apparent and improved decisions regarding probability of attaining a particular estimated time of arrival may be obtained by a user.

Figure 11:
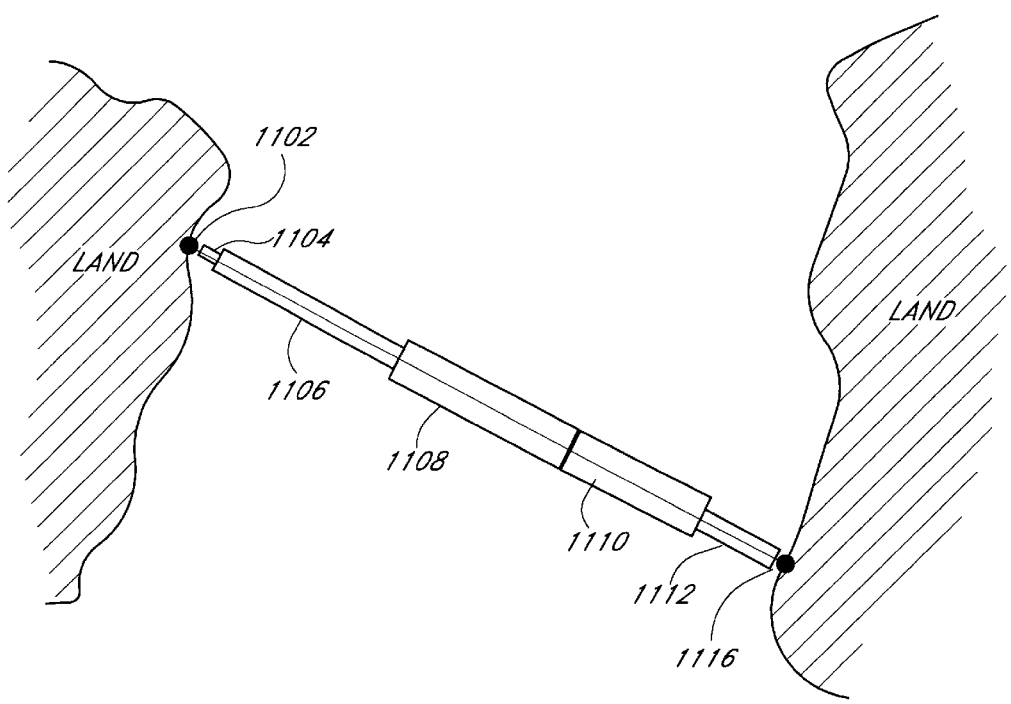
FIG. 11 is an illustration of an exemplary map showing of a route of a ship and various speed zones.

FIG. 11 depicts a voyage undertaken by a ship originating in Port 1102 and terminating at Port 1116. FIG. 11 is merely an example of a route that may be used with the preferred embodiments of the present invention. It will be immediately apparent to those skilled in the art that this technique similarly applies to other voyage routes and conditions. During the voyage shown in FIG. 11, a captain has planned to maneuver out of Port 1102 at slow speed until accelerating to a cruise speed within zone 1104, clear of traffic and control areas. FIG. 11 shows multiple additional speed zones 1106–1112. However, typically a cruise speed may be maintained for great distances, and such detailed breakdown may not always be required. In this example, upon reaching the zone 1112, the captain plans to slow the ship's speed as commonly required by high traffic zones and finally slows to minimal maneuvering speed adjacent to the harbor. Preferably, the captain may then supply this voyage plan to a computer operator who enters the data into a shore-based computer as indicated in Step 1440 of FIG. 14. The supplied voyage plan aids in maintaining or updating the model voyage plan.

Figure 13:
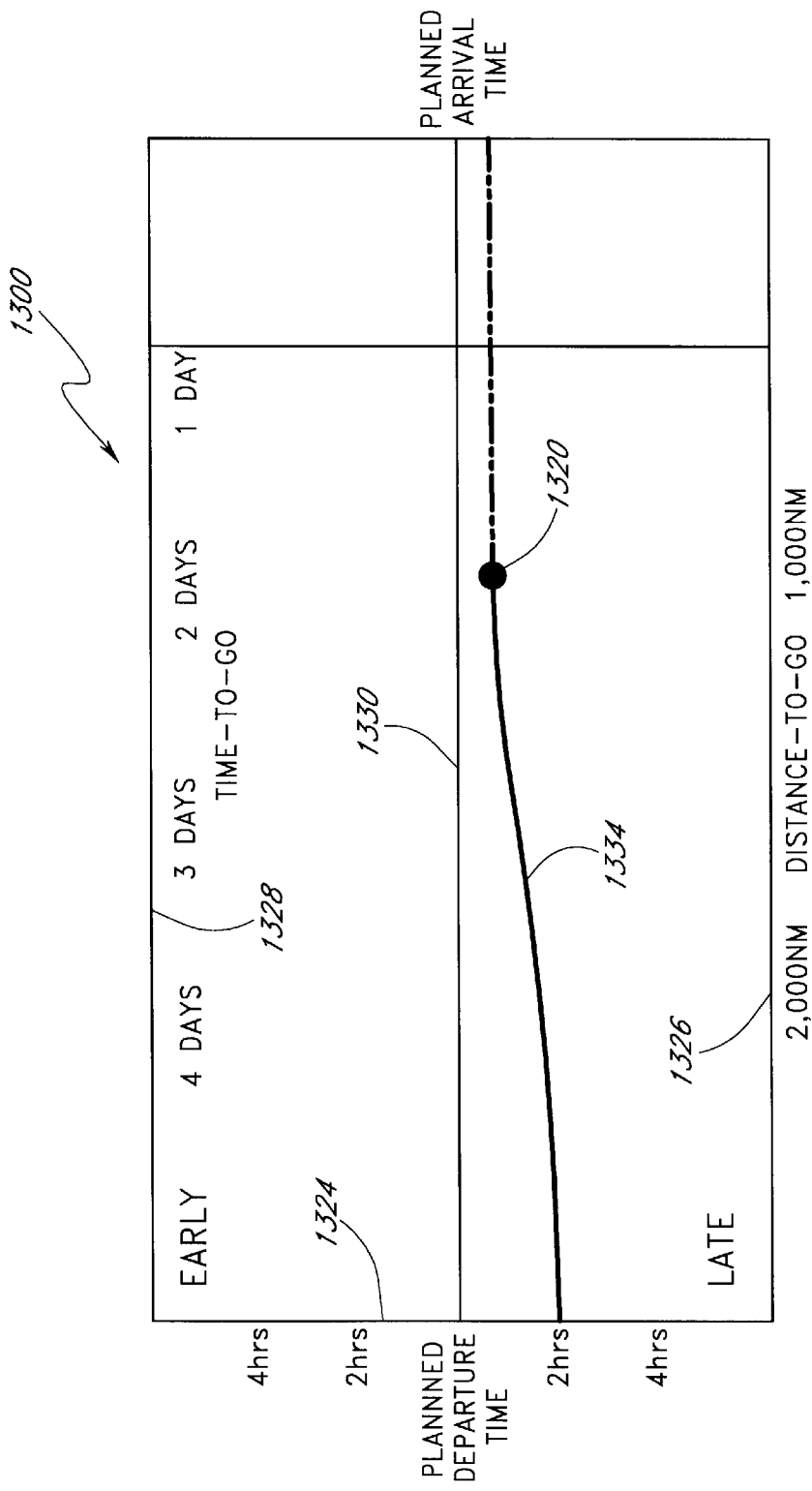
FIG. 13 is an exemplary illustration of a display for charting the progress of a ship.

FIG. 13 illustrates an exemplary preferred display 1300 where time ahead of schedule is plotted on a vertical axis 1324, a distance-to-go is plotted along the bottom horizontal scale 1326, and a time-to-go is plotted along a top horizontal scale 1328. Preferably, the bottom horizontal scale showing distance-to-go preferably remains fixed while the top horizontal scale showing time-to-go preferably varies with the speed of the ship under consideration.

The center horizontal axis 1330 of the display 1300 is a plot of locations and time if the subject ship remains exactly on the schedule. The center horizontal axis 1330 may be non-linear; however, the center horizontal axis is linear as shown in FIG. 13. The center horizontal axis 1330 shows how far ahead or behind schedule a ship is at a corresponding time of observation. Reaching positions along the ship's route ahead of schedule plots the ship's position 1334 above the axis 1330 and arriving late plots the ship's position below the axis 1330.

A ship's present route is referenced as numeral 1334 in FIG. 13. The solid line portion of the ship's route 1334 depicts the ship's time-ahead-of-schedule relative to the ship's distance-to-go that the ship has already traveled. The dotted line portion of the ship's present route 1334 depicts a predicted time-ahead-of-schedule relative to the distance-to-go. The ship's most current position is preferably depicted as a large dot, as shown in FIG. 13 as reference numeral 1320.

Figure 14:
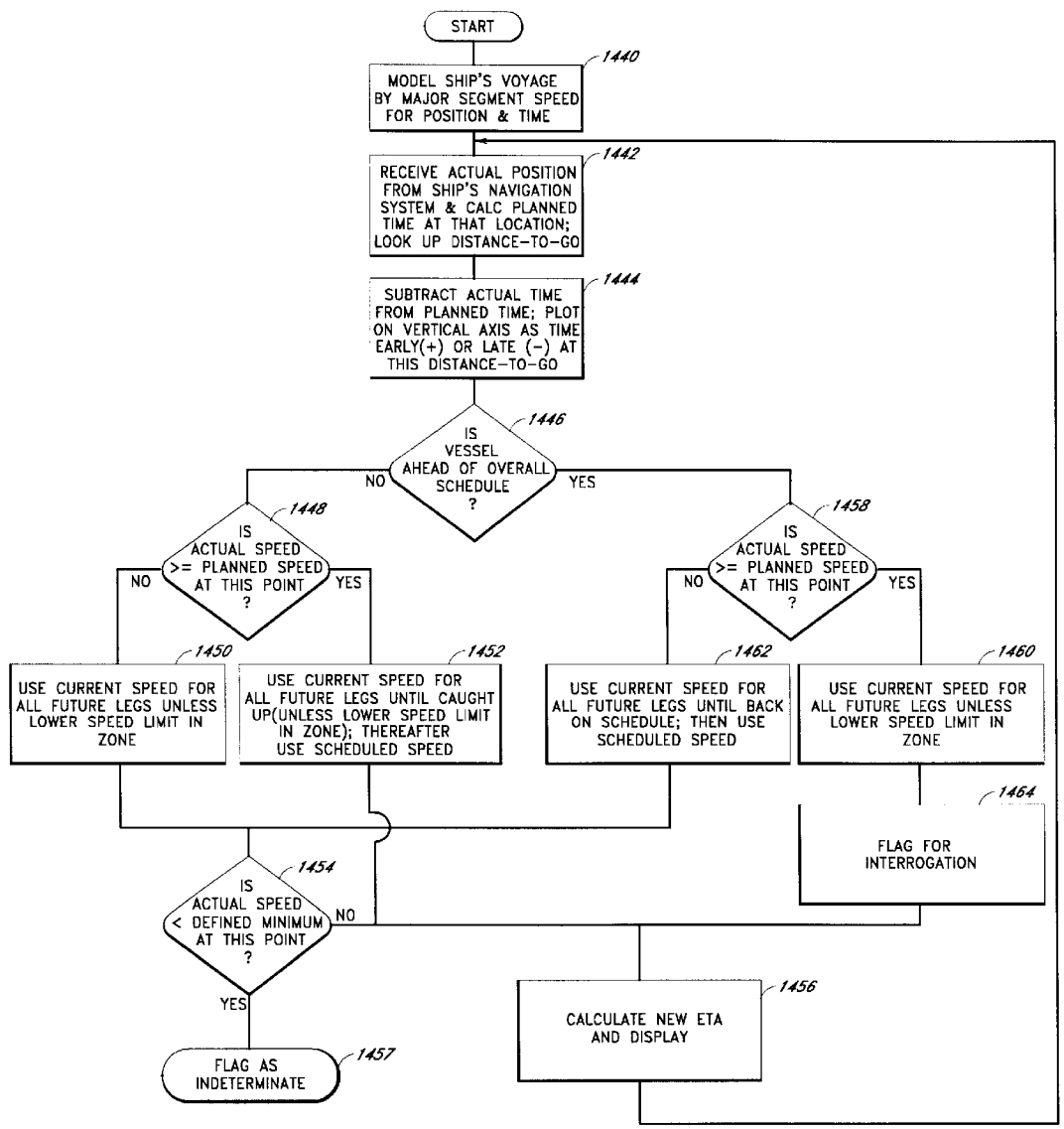
FIG. 14 illustrates a preferred series of steps for providing a projection of a ship's progress.

FIG. 14 depicts a preferred sequence of steps for projecting the movements of a ship. The results of the sequence of steps are preferably displayed, such as shown in FIG. 13. The initial step 1440 is to model the location of a ship over a route at any corresponding time based upon the speeds planned for each zone and the scheduled departure. It will be apparent to one skilled in the art that such calculation may be readily done by various methods. In a preferred embodiment, the calculation may be done in substantially real time by computer process as a ship progresses along the ship's route using wide employed methods of dead reckoning. In an alternative preferred embodiment, the entire route may be calculated prior to departure of the ship and placed in a database for later reference.

As shown in FIG. 14, the second step 1442 preferably calculates the vertical displacement from the planned schedule. For example, a ship's location may be received over the Internet and the planned time at the position is calculated or referenced in a database. At step 1444, the actual time is then subtracted from the planned time and applied as the vertical coordinate "time ahead of schedule".

Figure 12:
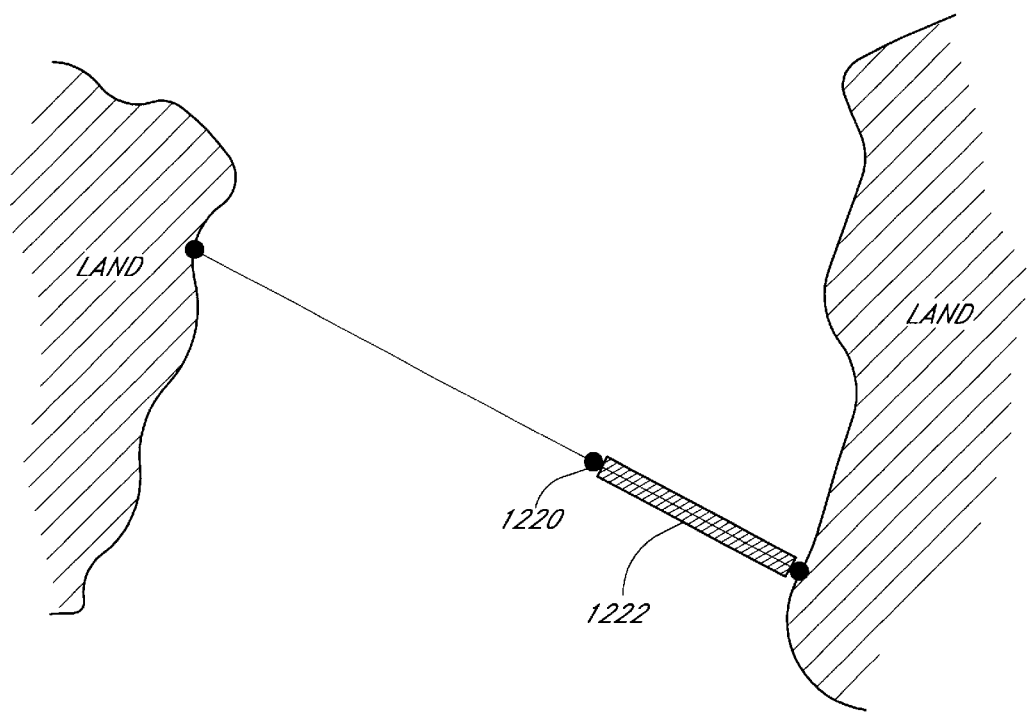
FIG. 12 is an illustration of an exemplary map showing of a route of a ship and a remaining distance for the ship to travel.

For example, FIG. 12 illustrates a ship 1220 well along in its voyage and has a remaining distance-to-go 1222. The distance-to-go 1222 over the planned route is preferably derived from a model route, as described above. The distance-to-go may then be applied on a graph, such as depicted in FIG. 13, as the horizontal coordinate and the time behind schedule is applied as the vertical coordinate. Plotting the time-to-go and the time behind schedule as a continuous line 1234 provides an excellent assessment of trend in catching up or falling further behind schedule.

A further aspect of the fifth embodiment is the application of the trend to a model of the remainder of a ship's voyage. As shown in FIG. 14, evaluation Step 1446 illustrates that if the value of "time ahead of schedule" is negative, i.e. behind schedule, then evaluation Step 1448 assesses whether the ship's speed of advance is greater than or equal to that scheduled for the zone. Speed of advance is defined as the portion of a velocity vector parallel to the great circle route to the destination. If the speed of advance is less than or equal to the scheduled speed, then the logical assumption is made that the subject ship is for some reason unable to make the planned speed and cannot be expected to be able to catch up to the original schedule. Step 1450 specifies as a result, that for all future legs the current speed will be the maximum unless lower limits are scheduled in some zones.

Conversely, if the speed of advance is determined at evaluation Step 1448 to be greater than that planned, the logical assumption is made that the ship is attempting to catch up to schedule. Thus Step 1452 specifies that the higher speed will only be maintained until the ship has gotten back on schedule and speed will be reduced to save wear-and-tear on the ship.

Furthermore, evaluation Step 1446 illustrates that if the value of "time ahead of schedule" is positive, then evaluation Step 1458 assesses whether the ship's speed is greater than or equal to that scheduled for the zone. If it is not, then the logical assumption is that the ship is running slowly to get back on schedule. Thus, Step 1462 specifies that once the ship is back on schedule it will resume a higher speed and follow the original schedule.

If the speed of advance of the ship is found to be greater than scheduled, the logical assumption is made that the ship is not following the published schedule and will arrive significantly early. In this case, Step 1460 specifies the use of the current speed until zone speed limits require it to slow down. Step 1464 simply flags the result for interrogation by the shipping agent.

Returning to the two cases referenced by numerals 1450 and 1462 where speed is below plan, a final check on progress is made in evaluation Step 1454, which assures that a major event will not have taken place that has slowed the ship drastically without being recognized. If the speed of advance falls below a pre-set level—in the preferred embodiment just ½ of the planned speed—then the program flags the arrival time as indeterminate 1457. Other levels might be selected such as less than five knots or that which would cause the arrival to be more than 24 hours late.

If the speed of advance is within the above limits, then Step 1456 calculates the current ETA based upon the rules produced along each path and displays it for the user. The cycle preferably repeats itself and begins again at Step 1442. The cycle preferably repeats itself in predetermined time intervals. For example, the time intervals between the cycle repeating may be much greater while the ship is further away from the destination port than when the ship is close to port. Alternatively, the time intervals may be constant throughout the ship's voyage or the time intervals may be continuous. In one preferred embodiment, the time intervals vary according to the location of the ship relative to the destination port. Furthermore, in an alternative preferred embodiment, a user may initiate the cycle independent of a time interval.

Although described above in connection with particular embodiments of the present invention, it should be understood the descriptions of the embodiments are illustrative of the invention and are not intended to be limiting. Accordingly, various modifications and applications may occur to those skilled in the art without departing from the true spirit and scope of the invention as defined in the appended claims.

What is claimed is:

1. A method of identifying marine ships undergoing suspicious activity in predefined zones from a remote location utilizing reports periodically transmitted from the marine ships, comprising:

defining zones of suspicious activity and values corresponding to each of said zones of suspicious activity, said values including minimum speed values and change in track values;

defining appropriate ship tolerances corresponding to each of said zones of suspicious activity, said appropriate ship tolerances including a time tolerance, a speed tolerance and a change in track tolerance;

storing said zones of suspicious activity and said appropriate ship tolerances in a database;

via a remote tracking center, receiving ship data including current position data, current speed data and current track data from a ship, the ship having stored ship tolerances stored in the ship and only sending said ship data to said remote tracking center when one of said stored ship tolerances is exceeded;

comparing said stored ship tolerances with said appropriate ship tolerances;

sending said appropriate ship tolerances to the ship when said stored ship tolerances are not the same as said appropriate ship tolerances;

comparing said current position data with said stored geographical zones for determining if said ship is in one of said zones of suspicious activity;

selecting the values corresponding to said stored zone of suspicious activity when said ship is in one of said zones of suspicious activity;

when said ship is in one of said stored zones of suspicious activity, analyzing said ship data with said values corresponding to said stored zone of suspicious activity for determining if said ship is undergoing suspicious activity; and flagging the ship for investigation when said ship is undergoing suspicious activity.

2. The method of claim 1, wherein said ship is undergoing suspicious activity if said ship is undergoing maneuvers suggestive of boarding.

3. The method of claim 2, wherein the ship is undergoing maneuvers suggestive of boarding if the current speed data indicates that the ship is traveling below the minimum speed value corresponding to the zone of suspicious activity.

4. The method of claim 2, wherein the ship is undergoing maneuvers suggestive of boarding if the current track data indicates that the ship significantly changed its track into the wind.

5. A method of identifying marine ships undergoing suspicious activity in predefined zones from a remote location utilizing reports periodically transmitted from the marine ships, comprising:

defining boundaries of geographic zones and threshold values corresponding to each of said geographic zones;

storing said boundaries and threshold values in a database;

via a remote tracking center, receiving ship data from a ship including a current position of a ship, the ship having ship tolerances and only sending said ship data to said remote tracking center when at least one of said ship tolerances is exceeded;

comparing said position data with said geographical zones for determining if said ship is in one of said geographic zones;

when said ship is in one of said geographic zones, selecting the threshold values corresponding to said geographic zone and analyzing said ship data with the threshold values for determining if said ship is undergoing maneuvers suggestive of boarding; and when said ship is undergoing maneuvers suggestive of boarding, flagging the ship for investigation.

6. The method of claim 5, wherein the ship data further includes a current ship speed and a current ship track, and wherein said threshold values include minimum ship speed values and maximum change in ship track values.

7. The method of claim 6, wherein analyzing said ship data with the threshold values further comprises:

comparing said current ship speed with said minimum ship speed value; and flagging said ship for investigation when said current ship speed is below said minimum ship speed value.

8. The method of claim 6, further comprising:

determining a change in track of the ship;

comparing the change in the track of the ship with the maximum change in track value; and when said change in the track is above the maximum change in track value, comparing current ship wind data with said current ship track for determining if the ship is undergoing maneuvers suggestive of boarding.

9. The method of claim 5, further comprising:

defining appropriate tolerances;

determining the appropriate tolerances corresponding to the position of the ship;

comparing the appropriate tolerances with said ship tolerances; and sending the ship the appropriate tolerances when said ship tolerances are not the same as the appropriate tolerances.

10. The method of claim 9, wherein the appropriate tolerances comprise a time tolerance, a speed tolerance and a change in track tolerance.

11. A method of identifying marine ships undergoing suspicious activity in predefined zones from a remote location utilizing reports periodically transmitted from the marine ships, comprising:

via a tracking center, tracking the changes in the position of a ship with respect to predefined zones;

in the tracking center, storing speed threshold values for each of the zones;

via a receiver in the marine ship, receiving signals from a transmitter of a navigational positioning system;

in said marine ship, monitoring marine ship data, said data including a current ship track and a current ship speed;

in the marine ship, comparing said ship data with predefined tolerances and sending a ship report to said tracking center when said ship data exceeds at least one of said tolerances, said ship report comprising a current ship position, a current ship track and a current ship speed;

via a communication unit in said tracking center, receiving said report from said marine ship;

in the tracking center, comparing the current ship position with predefined zones for determining if the position of the marine ship is within one of said zones;

in the tracking center, analyzing said ship report for determining if the ship is undergoing suspicious activity only when the position of the marine ship is within one of said zones; and flagging said ship for investigation only when said ship is undergoing suspicious activity.

12. The method of claim 11, further comprising:

defining ship tolerances corresponding to the position of the ship;

determining if said ship has correct ship tolerances that correspond to the current position of the ship;

when said ship does not have the correct ship tolerances, transmitting the correct ship tolerances to said ship;

via said ship, receiving the correct tolerances and setting the tolerances equal to the correct ship tolerances.

13. The method of claim 11, wherein analyzing said ship report further comprises:

determining current ship wind direction corresponding to the position of the marine ship; and comparing the current track with said current wind direction for determining if the ship is heading in a direction favorable to boarding said ship.

14. The method of claim 11, further including via the tracking center, transmitting a warning message to a government authority only when said ship is flagged.

15. The method of claim 11, further including defining said zones.

16. The method of claim 11, wherein said navigational positioning system is the Global Positioning System (GPS).

17. The method of claim 11, further comprising:

in said marine ship, starting a counter;

when the counter reaches a predetermined maximum count, transmitting said report to said remote tracking center; and upon transmission of a message to the tracking center, resetting said counter.

18. An marine ship tracking system adapted to automatically identify suspicious activity by marine ships utilizing reports that are periodically transmitted from the ship to a remote tracking center, comprising:
- a remote tracking center adapted to track the changes in the position of a ship and identify suspicious activity by said ship;
- a mobile monitoring unit in said ship including a navigation receiver adapted to receive position signals from a transmitter of a positioning system, and said mobile monitoring unit adapted to receive updated ship movement information;
- a storage database subsumed in said mobile monitoring unit for storing predefined tolerances;
- a processor subsumed by said mobile monitoring unit adapted to analyze said updated ship movement information with said predefined tolerances, and adapted to trigger a ship report to be sent via satellite to said remote tracking center when at least one of said tolerances is exceeded;
- a storage database subsumed by said remote tracking center adapted to store said ship reports;
- a control logic unit subsumed by said remote tracking center adapted to analyze said ship reports with predefined data for determining if said ship is undergoing suspicious maneuvers.

19. The tracking system of claim 18, wherein said ship report comprises at least a portion of said updated movement information.

20. The tracking system of claim 18, wherein said navigation receiver is a Global Positioning System receiver.

21. The tracking system of claim 18, wherein said predefined data includes minimum speed values.

22. The tracking system of claim 18, wherein said predefined data includes change in track values.

* * * * *